(12) United States Patent
Muzio et al.

(10) Patent No.: US 7,218,583 B2
(45) Date of Patent: May 15, 2007

(54) METHOD FOR LAND PRE-PIT RECOVERY

(75) Inventors: Pierluigi lo Muzio, Villingen-Schwenningen (DE); Christian Büchler, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 574 days.

(21) Appl. No.: 10/866,419

(22) Filed: Jun. 10, 2004

(65) Prior Publication Data
US 2004/0252607 A1 Dec. 16, 2004

(30) Foreign Application Priority Data

Jun. 10, 2003 (EP) .................................. 03013018
Oct. 21, 2003 (EP) .................................. 03024195

(51) Int. Cl.
*G11B 15/52* (2006.01)
(52) U.S. Cl. .................................. 369/47.17; 369/53.31
(58) Field of Classification Search ...................... None
See application file for complete search history.

(56) References Cited

U.S. PATENT DOCUMENTS

| | | | |
|---|---|---|---|
| 6,345,023 B1 * | 2/2002 | Fushimi et al. .......... | 369/47.36 |
| 6,856,586 B2 * | 2/2005 | Usui et al. ................ | 369/47.28 |
| 6,975,578 B2 * | 12/2005 | Endoh et al. ............. | 369/275.4 |
| 7,110,333 B2 * | 9/2006 | Oh ........................... | 369/47.22 |
| 7,113,467 B2 * | 9/2006 | Schep ...................... | 369/53.34 |
| 7,158,465 B2 * | 1/2007 | Eom ........................ | 369/59.25 |
| 2001/0028613 A1 | 10/2001 | Okamoto et al. ........ | 369/44.25 |
| 2002/0021636 A1 | 2/2002 | Moriwaki ................ | 369/47.22 |
| 2002/0105882 A1 | 8/2002 | Kiyose .................... | 369/53.34 |

FOREIGN PATENT DOCUMENTS

| | | |
|---|---|---|
| EP | 0751506 A2 | 1/1997 |
| EP | 0945866 A2 | 9/1999 |
| EP | 0996118 A2 | 4/2000 |
| EP | 1229546 A1 | 8/2002 |

OTHER PUBLICATIONS

EPO Search Report.

* cited by examiner

*Primary Examiner*—Paul W. Huber
(74) *Attorney, Agent, or Firm*—Joseph J. Laks; Robert D. Shedd; Reitseng Lin

(57) ABSTRACT

The present invention relates to a method for recovering land pre-pits from a signal obtained from an optical recording medium. According to the invention, the method comprises the steps of:
  providing a phase locked loop for the land pre-pit signal for the accurate measurement of the phase of the land pre-pits, and
  generating a corrected wobble signal for rejecting wobble beats.

15 Claims, 3 Drawing Sheets

METHOD FOR LAND PRE-PIT RECOVERY

This application claims the benefit, under 35 U.S.C. § 365 of European Patent Application 03013018.1, filed Jun. 10, 2003 and European Patent Application 03024195.4, filed Oct. 21, 2003.

FIELD OF THE INVENTION

The present invention relates to a method and a device for recovering land pre-pits from an optical recording medium, and to an apparatus for reading from and/or writing to optical recording media using such method or device.

BACKGROUND OF THE INVENTION

According to the specification of the DVD-RW (Standard ECMA-338-80 mm (1.46 Gbytes per side) and 120 mm (4.70 Gbytes per side) DVD Re-recordable Disk (DVD-RW)), the push-pull signal obtained from this type of optical recording medium includes a land pre-pit (LPP) signal and a wobble signal. The LPP signal consists of a sequence of peaks. The wobble signal is a sinusoidal signal. The peaks of the LPP signal are quite narrow in comparison with the period of the wobble, and are superimposed on the wobble. Only one peak occurs for each wobble period and its phase relative to the wobble is 270° with a tolerance of ±10°. Most of the wobble periods do not have a peak. Only some of them, minimum one and maximum three of 16 periods, can have a peak. This rule is defined by the specific data coding of LPP data. In every pair of Sync frames (16 wobble periods), there is a set of three bits, which determine the presence of peaks according to on/off modulation. The set is either at the beginning of the first frame or at the beginning of the second one. The first bit of the set is a frame Sync bit, so it is always 1. The second bit is a sector Sync bit, so it is always 1 in the first pair of Sync frames of the sector (26 frames). The third bit is a data bit. Only in the first pair of Sync frames the third bit is not a data bit, but is related to the location of the set, namely 1 for the first frame, 0 for the second one.

For writing to the disk a DVD recorder has to be locked to the wobble signal and to decode the LPP data. Unfortunately, several interfering disturbances degrade the quality of the push-pull signal:
1.) Tracking error signal: This signal is located in the lower part of the frequency spectrum. Therefore, it does not disturb the wobble signal, which has higher frequency. However, it interferes with the LPP signal, specifically the sector Sync word, which has a very low frequency.
2.) Residual data signal HF: When the focus of a light beam used for reading is not perfectly located on the track, the four output currents of a photodetector used for detecting the light reflected from the disk are not perfectly balanced. When the push-pull signal is produced, a part of the data signal HF passes. This data signal HF does not disturb the wobble signal, which has lower frequency, but it disturbs the LPP signal.
3.) Disk speed variations: The eccentricity, the servo control loop and the constant angular velocity (CAV) cause changes of the disk speed. Therefore, the wobble signal is not a pure sinus, but it is frequency modulated according to the disk speed with a corresponding spreading of the bandwidth.
4.) Interference of adjacent tracks: The wobble signal of adjacent tracks overlaps with the wobble signal of the current track, generating an amplitude modulation of the wobble signal and violating the abovementioned phase relationship. Therefore, the physical tolerance of ±10° is dramatically increased.

It is an object of the invention to provide a method for recovering land pre-pits with a decoder from a signal obtained from an optical recording medium, which overcomes the above problems.

SUMMARY OF THE INVENTION

According to the invention, the method includes the steps of:
   providing a phase locked loop for the land pre-pits for the accurate measurement of the phase of the land pre-pits, and
   generating a corrected wobble signal for rejecting wobble beats.

The invention provides for a separate phase locked loop to be used for the land pre-pits. This phase locked loop follows the land pre-pit signal and allows to generate a phase correction. Preferably, the land pre-pit signal is separated from the wobble signal to obtain a corrected wobble signal. The phase locked loop for the wobble is then purely synchronized to the wobble beat and generates a clock signal synchronous with the speed of the recording medium.

Favourably, the step of generating a corrected wobble signal includes providing a limiter for cutting peaks in the original wobble signal. This allows a better separation of the land pre-pit signal from the wobble signal, i.e. the quality of the wobble signal is improved. Preferably, also a DC component is removed from the wobble signal.

Advantageously, the step of generating a corrected wobble signal further includes providing a correlator for passing only the wobble frequency component. Such a correlator has the effect of a very narrowband notch filter and further enhances the separation of the land pre-pit signal from the wobble signal.

According to one aspect of the invention, the step of generating a corrected wobble signal includes the steps of:
   in case the decoder is not locked to the land pre-pits, subtracting a value corresponding to the sum of the DC level of the wobble signal and the amplitude of the wobble signal from the wobble signal, the value being fixed during a wobble period, and
   in case in case the decoder is locked to the land pre-pits, subtracting a value corresponding to the sum of the DC level of the wobble signal and the reconstructed version of the wobble signal, including the wobble beat, from the wobble signal. Due to the tracking error signal the level of the push pull signal is not fixed, but it varies from one wobble period to the other. In order to detect the amplitude of the LPP peaks, the signal is clamped, so that the wobble remains in the positive range and the peak in the negative range. If the decoder is not yet locked to the land pre-pit signal, the clamped signal is generated by subtracting a value with a subtractor, which is fixed during the wobble period and which is estimated as the sum of the DC level of the signal plus the amplitude of the wobble. In case the decoder is locked to the land pre-pit signal, the pure land pre-pit signal is calculated by subtracting the DC level and the reconstructed version of the wobble signal, including the wobble beat.

Advantageously, the DC level of the wobble signal is calculated using a prediction of a previous wobble period without a land pre-pit peak. The DC level is calculated by integrating the signal over one wobble period using an integrate&dump. Since a land pre-pit peak would disturb this calculation, the prediction of a previous wobble period without such a peak is used.

Favourably, the step of generating a corrected wobble signal further includes using a phase offset determined by the phase locked loop for the land pre-pits for generating a corrected wobble synchronized to the track. One of the purposes of the phase locked loop for the land pre-pits is the extraction of the phase difference between the land pre-pits and the wobble. Using this phase difference a new synchronized wobble signal is generated. This wobble signal is synchronized with the current track and can be fed to another phase locked loop for write clock generation.

Advantageously, a low-noise phase detector is provided for the phase locked loop for the land pre-pits. Such a low-noise phase detector is needed for a proper detection of the phase difference between the land pre-pits and the wobble.

Favourably, a correlator is provided for the low-noise phase detector of the phase locked loop for the land pre-pits for rejecting pseudo land pre-pits occurring outside proper time slots. The correlator preferably includes a multiplier, an integrate&dump, and a function generator. Such a correlator allows to implement a low-noise phase detection method. In fact, because the result is not based on a unique sample, but on several samples of the input signal, the integration rejects some noise.

Advantageously, the function generator for the correlator generates detection gates for the low-noise phase detector. The range of the detection define the phase region where the phase detector produces useful results. Outside this range the result of the detector is forced to zero, because the peaks are expected only within a limited phase shift with respect to the locked wobble. A further extension of the range would only generate noise at the output of the detector.

Favourably, the phase locked loop for the land pre-pits is used for obtaining a phase difference between the land pre-pits and the wobble signal. This phase difference is on the one hand used for generating the corrected wobble signal, on the other hand it is employed for improving the phase and amplitude detection of the land pre-pits within a land pre-pit demodulator.

Preferably a land pre-pit filter is provided for reducing noise. Advantageously, the land pre-pit filter includes a whitening filter. For the demodulation of the LPP signal correlation methods are preferred, which are less affected by noise. The best correlator for the demodulation of the amplitude is a matched filter. Assuming that white noise disturbs the LPP signal, the LPP filter impulse response preferably replicates the shape of the peaks. However, since the spectrum of the residual data signal HF is not flat, it cannot be considered as white noise. Therefore, a whitening filter is added in front of the filter matched to the LPP peaks. Considering that in this case the whitening filter is a low-pass filter, it is realised by enlarging the impulse response of the filter. Favourably, the land pre-pit filter includes a correlator having a multiplier, a function generator, and an integrate&dump.

Preferably the function generator generates a triangular pulse for matching the shape of the land pre-pits. This allows to smoothen the consequences of a limited, i.e. not perfect synchronization or the LPP phase tolerance (10°). When a triangular impulse response filter is used, it is sufficient to enlarge the triangle of its impulse response to obtain a simple approximation of the whitening filter.

Advantageously, a method according to the invention is used in a device for recovering land pre-pits from a signal obtained from an optical recording medium. Furthermore, a method according to the invention or a device using such method is favourably used in an apparatus for reading from and/or writing to recording media.

BRIEF DESCRIPTION OF THE DRAWINGS

For a better understanding of the invention, an exemplary embodiment is specified in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
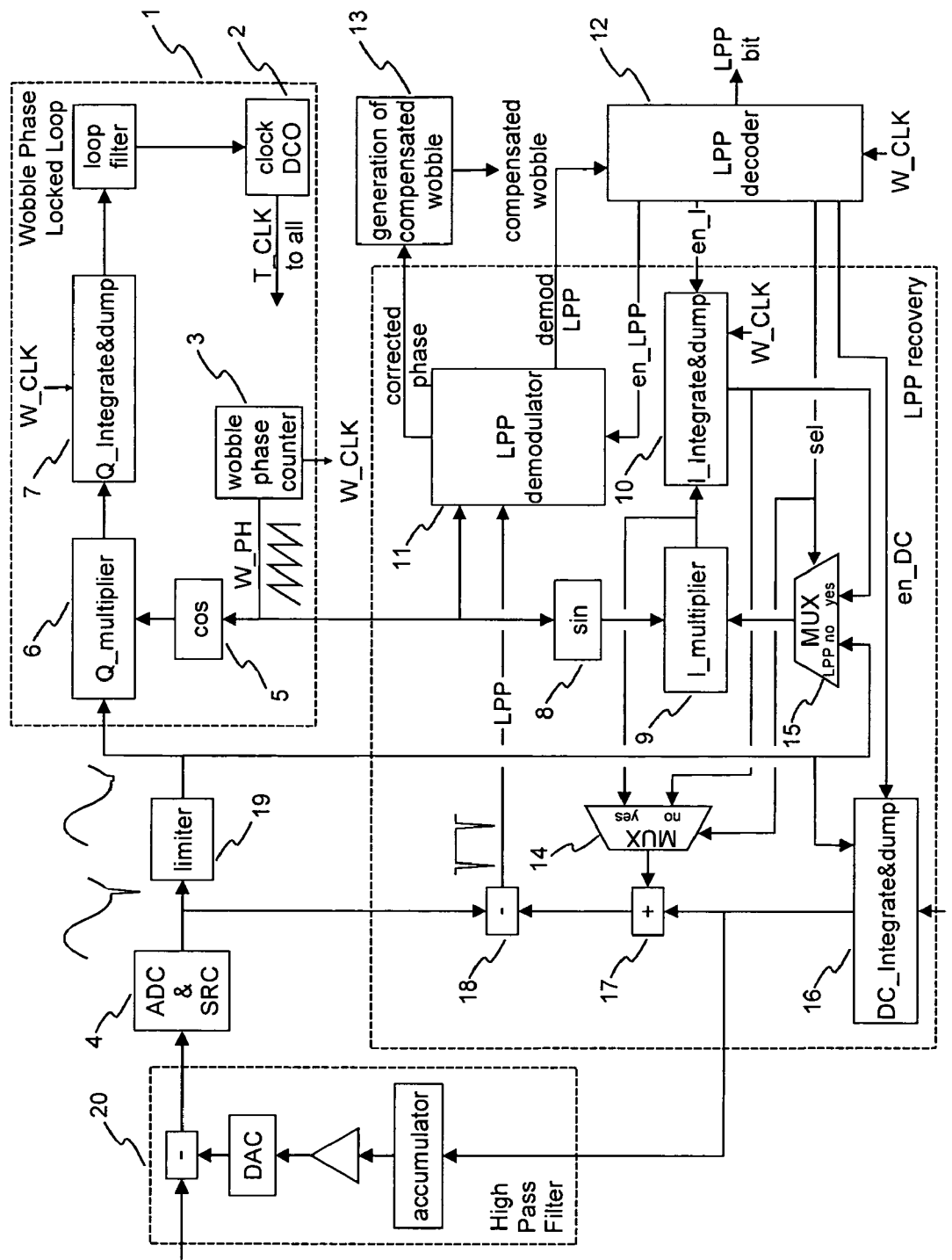
FIG. 1 shows a block diagram of a demodulator according to the invention.

In FIG. 1 the block diagram of a demodulator according to the invention is shown. In order to retrieve the amplitude of the peaks, the demodulator searches for the time at which the peaks are located. The phase and the frequency of the peaks are not stable due to disk speed variations. The spectrum of the peaks has several components at the distance of $F_W/16$, where $F_W$ is the wobble frequency, and all of them are affected by disk speed variations. A phase locked loop (PLL) 1, which tries to lock directly to the peaks, might erroneously lock to a spurious frequency component. Therefore, a first step for the synchronization of the demodulator is to lock to the wobble as a pure tone.

A digital controlled oscillator (DCO) 2 of the PLL 1 generates a clock signal T_CLK, which is a clock signal synchronous with the disk speed. A wobble phase counter 3, using the clock signal T_CLK, generates a wobble phase signal W_PH, which is a saw tooth signal locked to the wobble. A sample rate converter (SRC) 4 synchronizes the data rate of the signal to the disk speed. All the blocks use the clock signal T_CLK running synchronously with the disk speed.

The phase detector of the wobble PLL is a correlator, which includes a cos generator 5, a multiplier 6 and an integrate&dump 7. The integrate&dump 7 integrates the signal over a wobble period and dumps at the end of the period using a wobble clock pulse W_CLK generated by the wobble phase counter 3, as a terminal count. The last value of the integration, before the dump, is held in a register, which is updated every wobble period.

A similar correlator including a sin generator 8, a multiplier 9, and an integrate&dump 10, is used also for the in-phase path in order to measure the amplitude of the wobble, which is needed for the extraction of the LPP signal. Then an LPP demodulator 11, using the abovementioned wobble phase signal W_PH, applies a proper filter, and an LPP decoder 12 extracts the LPP data.

However, with the wobble beat another problem arises. Due to the interference from adjacent tracks, the PLL 1, which locks to the wobble, has a small phase error. In fact, the interference with adjacent tracks adds another sinusoidal waveform to the wobble, which has an uncorrelated phase and a lower amplitude. Considering that the phase offset is random, but it is quite stable and it changes very slowly, the resulting waveform still has the same frequency, but its phase is modified. Therefore, the wobble PLL 1 is able to perfectly retrieve the frequency, but its phase, the saw tooth at the output of the PLL 1, needs to be corrected to obtain the exact timing of the current track. This corrected timing is also needed for another reason. The recorder's write clock should be synchronized to the effective wobble of the current track. A compensated wobble is generated by a compensation block 13 using the corrected phase for the synchronization of the recorder. The compensation of the wobble is implemented using the LPP peaks. This is possible for the following reasons:

- peaks of adjacent tracks cannot overlap with the peaks of the current track, because of the LPP coding rule for DVD-RW, which shifts the LPP set of three bits relative to the adjacent frame, when LPP peaks of the current track would be close to the LPP peaks of adjacent tracks,
- variations of the phase offset are much slower than the variations of the wobble phase. Therefore, the above-mentioned problem for the direct retrieval of the phase of the peaks does not exist for the lock of the phase offset.

Then, for the recovery of the amplitude of the peaks and for the phase compensation, the LPP signal is precisely retrieved.

Due to the tracking error signal the level of the push pull signal is not fixed, but it varies from one wobble period to the other. In order to detect the amplitude of the LPP peaks, the signal is clamped, so that the wobble remains in the positive range and the peak in the negative range.

Figure 2:
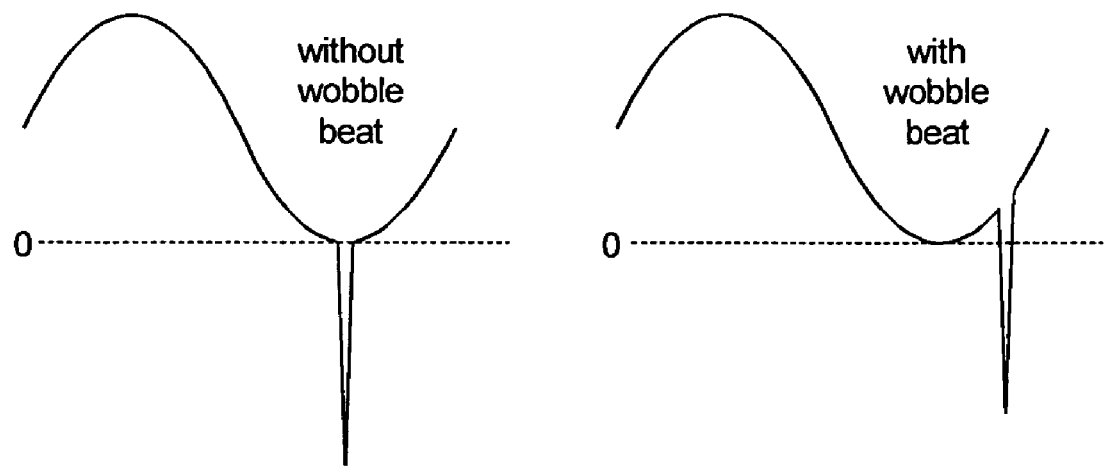
FIG. 2 schematically shows the influence of wobble beat.

Before the decoder 12 locks to the LPP signal for synchronizing its wobble and frame counters 30 (shown in FIG. 3), the two multiplexers 14, 15 illustrated in FIG. 1 select their respective first input, (corresponding to "no LPP present"). For the demodulation of the LPP peaks, the clamped signal is generated by subtracting a value with a subtractor 18, which is fixed during the wobble period and which is estimated as the sum of the DC level of the signal plus the amplitude of the wobble. This solution works in the case of perfect synchronization of the LPP signal with the wobble signal. Due to the wobble beat, however, the peak is not exactly at the top of the wobble. Therefore, the amplitude of the peak, which is important for the demodulation, is decreased in an unpredictable way, as illustrated in FIG. 2. This problem does not limit the lock-in process of the decoder 12 that much, but it influences the data demodulation.

Therefore, a more sophisticated and expensive solution is needed after the lock-in. The pure LPP signal is calculated by subtracting the DC level and the reconstructed version of the wobble signal, including the wobble beat with the subtractor 18.

The DC level is calculated by integrating the signal over one wobble period using an integrate&dump 16. Since an LPP peak would disturb this calculation, the prediction of a previous wobble period without LPP peak is used. A proper enable signal, marked as en_DC in FIG. 1, is used to disable the register of the integrate&dump 16 when peaks are expected. Of course, this implies that the timing of the LPP is known in advance. Therefore, this precise extraction is adopted only after the lock of the decoder 12, when the wobble periods with LPP peaks are known. Before the decoder lock, a limiter 19 in FIG. 1 attenuates the negative effects of the LPP peaks. The DC level, calculated in this way, includes the effect of the tracking error signal. Consequently it varies a little bit from period to period.

The wobble signal is reconstructed by generating a local sinusoidal waveform locked to the wobble. This is done using a sin generator 8. This sin generator 8 receives a suitable timing signal W_PH from the wobble PLL 1. Its output is multiplied by an appropriate amplitude value using a multiplier 9. This value is estimated in the previous wobble period by correlating the received wobble with the sinusoidal signal of the sin generator 8. Preferably, due to the silicon cost of multipliers and sin generators, a single sin generator 8 and a single multiplier 9 are used for both functions, i.e. the correlation of the incoming wobble and the generation of the local wobble. This is feasible because the reconstructed wobble is calculated only in the wobble periods where the peaks are expected, while the correlator is not used for amplitude calculation in these wobble periods. In fact, the peaks would disturb the amplitude measurement. A prediction of the amplitude is used instead. When the integrate&dump 10 of the correlator employed for the amplitude measurement is not used, its register is disabled by means of an enable signal en_I and it feeds the last amplitude value.

A selection signal sel in FIG. 1 determines the wobble periods when LPP peaks are expected. Counting the wobble periods in a couple of frames (16 wobble periods), the wobble periods, when the peaks are expected, are no. 1, 3, 9, 11 if the decoder 12 is locked. Only for the first couple of frames in the sector, these values are different, no. 1, 2, 3, 9, 10. Therefore, apart from the first couple of frames, the prediction of amplitude values concerns the previous wobble period, considering the last measurement of the correlator. This prediction is a good estimation because the wobble amplitude does not change very rapidly and the beat of adjacent track is also very slow. In the case of the first couple of frames in the sector, the prediction is less precise because it concerns also the second or the third previous wobble periods. However, it is only used for LPP data synchronization and not for data decoding. Therefore, there are no important consequences as the LPP data synchronization relies mainly on the consistency of the peak location. Small amplitude errors are tolerated.

The same prediction is valid for the DC level calculation. In fact, the integrator 16 would even more in this case measure false values when peaks are present. Therefore, after the decoder lock, a similar prediction is used. Before the decoder lock is reached, the LPP peaks, disturbing DC and amplitude measurements, are partly discarded by the limiter 19.

The rejection of the tracking error signal, which is in the lower part of the frequency spectrum, is performed by a filter block 20 and is divided into two stages. The first stage is implemented by means of a simple feedback before an analog to digital converter (ADC) 4. The cut-off frequency is regulated by means of an attenuator, which searches the proper trade-off between low-frequency rejection and the attenuation of the first component of the LPP signal at the frequency $F_w/16$. The main goal of this filter is the proper adjustment of the signal within the dynamic range of the ADC 4. The full rejection of the tracking error signal is not necessary at this stage because the integrate&dump 7, 10 of the I and Q paths are able to discard it anyhow. In the second stage, for the proper extraction of the LPP signal, the residual tracking error signal is rejected by subtracting the predicted value of the residual DC value measured in the integrate&dump 16.

The demodulation of the LPP signal requires the detection of the peaks, specifically their amplitude and their phase with respect to the retrieved wobble. The main problem which affects the demodulation of the LPP signal is the residual data signal HF. Consequently, simple methods based on the measurement of the maximum value of the peak and its phase location, which might be sufficient for unrecorded disks in the DVD-R format, have serious limitations when applied to disks in the DVD-RW format. Therefore, a more robust demodulation scheme is needed.

Similar to the wobble demodulation, also for the demodulation of the LPP signal correlation methods are preferred, which are less affected by noise. Of course, a matched filter is the best correlator for the demodulation of the amplitude. Assuming that white noise disturbs the LPP signal, the LPP filter impulse response preferably replicates the shape of the peaks, which have approximately a triangular form. However, the spectrum of the residual HF signal is not flat and cannot be considered as white noise. Therefore, a whitening filter is added in front of the filter matched to the LPP peaks. Considering that in this case the whitening filter is a lowpass filter, it is realised by enlarging the impulse response of the filter. If a triangular impulse response filter is used, it is sufficient to enlarge the triangle of its impulse response to get a simple approximation of the whitening filter.

Figure 3:
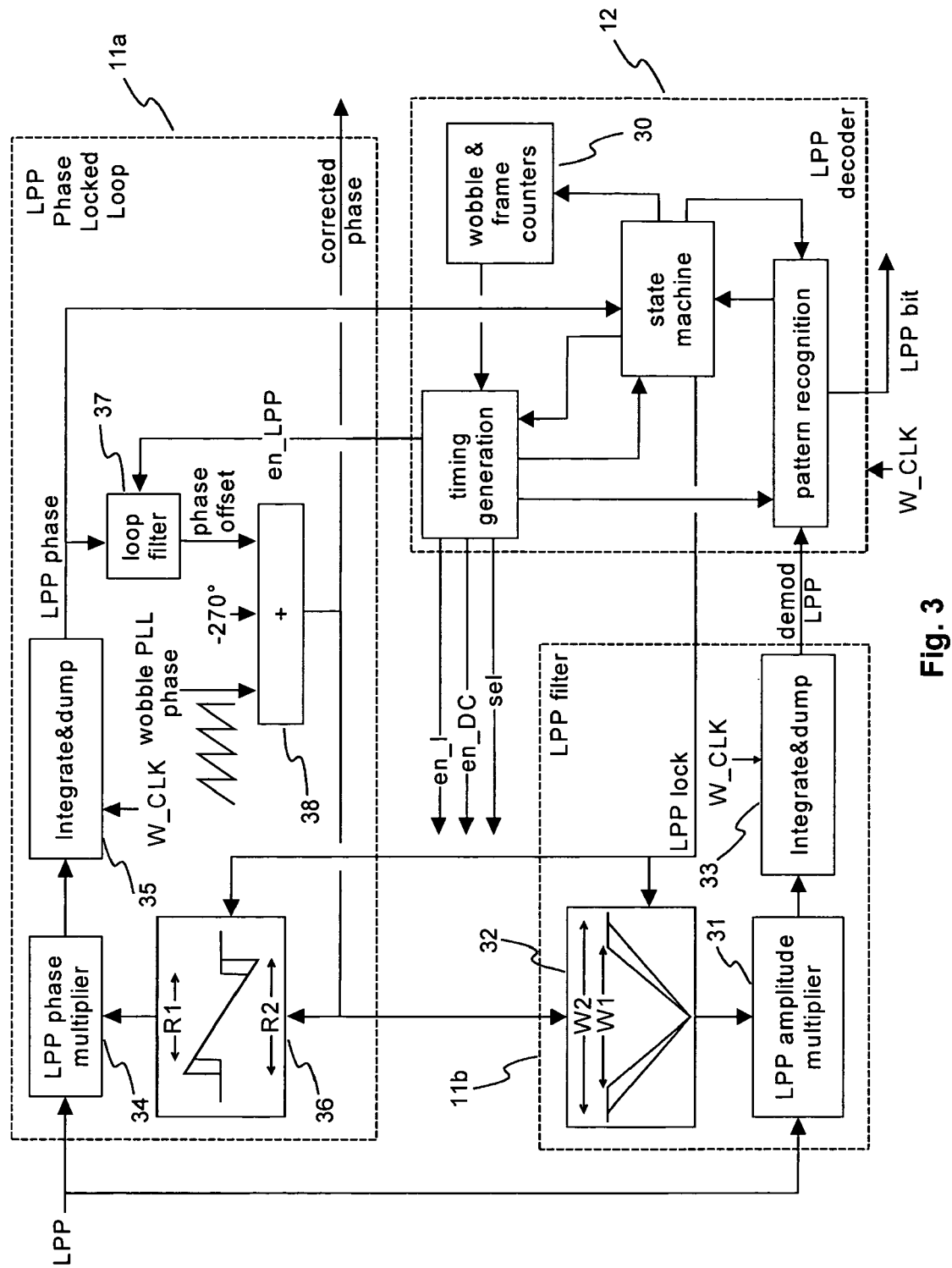
FIG. 3 shows a block diagram of an LPP demodulator and decoder.

In case the corrected phase synchronized with the LPP signal is available, the correlator of the amplitude demodulator $11b$ is preferably implemented by means of a multiplier 31, a function generator 32 synchronized with the corrected phase and an integrate&dump 33, as depicted in the bottom of FIG. 3. The width W1 of the generated pulse advantageously matches the input peaks of the LPP signal. Moreover, W1 is increased to include the effect of the whitening filter. If the decoder is locked but the phase error due to wobble beat has not yet been corrected (no LPP lock), a larger width W2 is selected for the LPP filter in the function generator of the correlator.

For the phase detection, which is performed by a phase detector, it is important to use a low-noise method. The correlator depicted in the top of FIG. 3, which includes a multiplier 34, an integrate&dump 35, and a function generator 36, allows to implement such a low-noise method. In fact, because the result is not based on a unique sample, but on several samples of the input signal, the integration rejects some noise.

The local waveform of the phase correlator is a symmetric ramp with a clipped range R. The output of the correlator is proportional to:
the phase difference between the local generated ramp and the peak at the input,
the energy of the peak.

The slope of the ramp defines the gain of the phase detector. Its range R defines the phase region where the phase detector $11a$ produces useful results. Outside this range the result of the detector is forced to zero, because the peaks are expected only within a limited phase shift with respect to the locked wobble. A further extension of the range would only generate noise at the output of the detector. Therefore, if the peaks are narrow, the range is preferably limited to the maximum phase shift. If the peaks are larger, the range is preferably increased to cover the whole peak, so that the integration is calculated over all the sampled values of the peak. Other factors, as the jitter of the wobble PLL 1, are advantageously taken into account by a further increase of the range.

The range R of the phase correlator is the sum of all the above factors: $R=2S+P+E$, where S is the maximum absolute deviation of the phase shift, P is the width of the peak and E is the error due to other factors such as jitter. If a value of R much higher than P is used, the noise at the output of the phase detector increases, because a higher number of noisy samples, which do not contain a useful signal of the peak, are passed to the integrator 35.

For a compensation of the phase error due to wobble beat, instead of the direct measurement of the phase error using the abovementioned phase detector, a PLL $11a$ using the same detector with a smaller range R reduces the noise of the corrected phase. The measured phase, at the output of the phase detector, is low-pass filtered by a loop filter 37 for obtaining the phase offset. The phase offset is then used as a phase correction, which is added to the phase generated by the first PLL 1 by an adder 38.

Considering that the LPP peaks are not repeated every wobble period, and that the frame Sync bit is repeated every couple of frames, the loop of the LPP PLL $11a$ is enabled only once for every couple of frames, when the Sync bit is detected by the LPP decoder 12. For this reason the LPP decoder 12 preferably sends a suitable enable signal en_LPP to the PLL loop filter 37, specifying the timing of the Sync bit, which may be in the first frame or in the second frame. Therefore, the phase detector measures the phase difference between the LPP phase and the corrected LPP phase, computed at the output of the loop. When the PLL $11a$ is locked, this phase difference is very small and the corrected phase is available at the output of the PLL $11a$, so the ramp is centred at the phase of the LPP and the detector operates with a minimum range R. Before the PLL lock, the peaks are searched in a wider range, i.e. a larger value of R is employed, because a phase shift is expected:

$$R2=2S+P+E.$$

When the LPP PLL $11a$ is locked, the range is preferably reduced to obtain a higher noise rejection, i.e. to reject samples which do not belong to the peak. In this case a smaller value of R is employed:

$$R1=P+E.$$

Considering the low bandwidth of the LPP PLL $11a$, it is assumed that the contribution E of the jitter is limited to the jitter of the wobble PLL 1 and the jitter of LPP PLL $11a$ is neglected.

A similar adaptive method is used for the amplitude correlator. After the lock-in process the width of the local waveform W is narrowed because there is a low phase error. On the other hand, during the lock-in process, a larger waveform is provided for catching the peak. Otherwise, due to the preliminary phase error which shifts the local waveform out of the LPP peak, the LPP amplitude is dramatically attenuated, with the risk of an unsuccessful lock-in process.

Another advantage of the PLL $11a$ in comparison with the direct measurement of the LPP phase concerns the sensitivity of the phase detector to the amplitude of the peaks. The direct measurement of the phase using the phase detector is affected by amplitude variations. In contrast, the solution by means of the PLL $11a$ better tolerates amplitude variations, which might influence the lock-in time of the PLL. Their influence on the residual error is low.

What is claimed is:

1. Method for recovering land pre-pits with a decoder from a wobble signal obtained from an optical recording medium having tracks, the method including the steps of:
providing a phase locked loop for the land pre-pits for the accurate measurement of the phase of the land pre-pits, and
generating a corrected wobble signal for rejecting wobble beats.

2. Method according to claim 1, wherein the step of generating a corrected wobble signal includes providing a limiter for cutting peaks in the original wobble signal.

3. Method according to claim 1, wherein the step of generating a corrected wobble signal includes providing a correlator for passing only the wobble frequency component.

4. Method according to one of claim 1, wherein the step of generating a corrected wobble signal includes the steps of:
   in case the decoder is not locked to the land pre-pits, subtracting a value corresponding to the sum of the DC level of the wobble signal and the amplitude of the wobble signal from the wobble signal, the value being fixed during a wobble period, and
   in case in case the decoder is locked to the land pre-pits, subtracting a value corresponding to the sum of the DC level of the wobble signal and the reconstructed version of the wobble signal, including the wobble beat, from the wobble signal.

5. Method according to claim 4, wherein the DC level of the wobble signal is calculated using a prediction of a previous wobble period without a land pre-pit peak.

6. Method according to one of claim 1, wherein the step of generating a corrected wobble signal includes using a phase offset determined by the phase locked loop for the land pre-pits for generating a corrected wobble synchronized to the track.

7. Method according to claim 1, further including the step of providing a low-noise phase detector for the phase locked loop.

8. Method according to claim 7, further including the step of providing a correlator for the low-noise phase detector of the phase locked loop for rejecting pseudo land pre-pits occurring outside proper time slots.

9. Method according to claim 8, further including the step of providing a function generator for the correlator for generating detection gates for the low-noise phase detector.

10. Method according to claim 1, further including the step of using the phase locked loop for the land pre-pits for obtaining a phase difference between the land pre-pits and the wobble signal.

11. Method according to claim 1, further including the step of providing a land pre-pit filter for reducing noise, the land pre-pit filter including a whitening filter.

12. Method according to claim 11, wherein the land pre-pit filter includes a correlator having a multiplier, a function generator, and an integrate&dump.

13. Method according to claim 12, wherein the function generator generates a triangular pulse for matching the shape of the land pre-pits.

14. Device for recovering land pre-pits from a signal obtained from an optical recording medium having tracks, wherein it performs a method according to claim 1 for recovering the land pre-pits.

15. Apparatus for reading from and/or writing to recording media, wherein it uses a method or comprises a device according to claim 1 for recovering land pre-pits from a signal obtained from an optical recording medium.

* * * * *